United States Patent [19]

Pope

[11] 4,080,435
[45] Mar. 21, 1978

[54] ALUMINUM CHLORIDE PRODUCTION PROCESS

[75] Inventor: Roy M. Pope, Maryville, Tenn.

[73] Assignee: Aluminum Company of America, Pittsburgh, Pa.

[21] Appl. No.: 673,269

[22] Filed: Apr. 2, 1976

Related U.S. Application Data

[63] Continuation of Ser. No. 423,808, Dec. 11, 1973, Pat. No. 3,959,439, Continuation-in-part of Ser. No. 180,373, Sep. 14, 1971, Pat. No. 3,796,551.

[51] Int. Cl.² ............................ C01F 7/56; C01F 7/58
[52] U.S. Cl. .................................... 423/496; 423/136; 423/137; 423/495
[58] Field of Search ................ 423/136, 137, 495, 496

[56] References Cited

U.S. PATENT DOCUMENTS

| | | | |
|---|---|---|---|
| 1,308,885 | 7/1919 | Abbott | 423/137 |
| 1,600,216 | 9/1926 | Dearborn | 423/136 |
| 1,619,022 | 3/1927 | Hall | 423/136 |
| 2,084,289 | 6/1937 | McAfee et al. | 423/136 |
| 2,084,290 | 6/1937 | McAfee | 423/136 |
| 2,446,221 | 8/1948 | Ferguson | 423/496 |
| 3,796,551 | 3/1974 | Pope | 423/495 X |
| 3,959,439 | 5/1976 | Pope | 423/136 |

Primary Examiner—Edward Stern
Attorney, Agent, or Firm—Robert E. Isner

[57] ABSTRACT

Multicourse liner construction for a fluidized bed reaction chamber for the chlorination of alumina bearing material including a reaction-chamber-defining inner course of essentially non-reactive carbon, an outer course of heat insulating refractory material, and an intermediate course of high density and essentially non-reactive material to minimize undesired flow of reactant chlorine externally of said reaction chamber.

1 Claim, 1 Drawing Figure

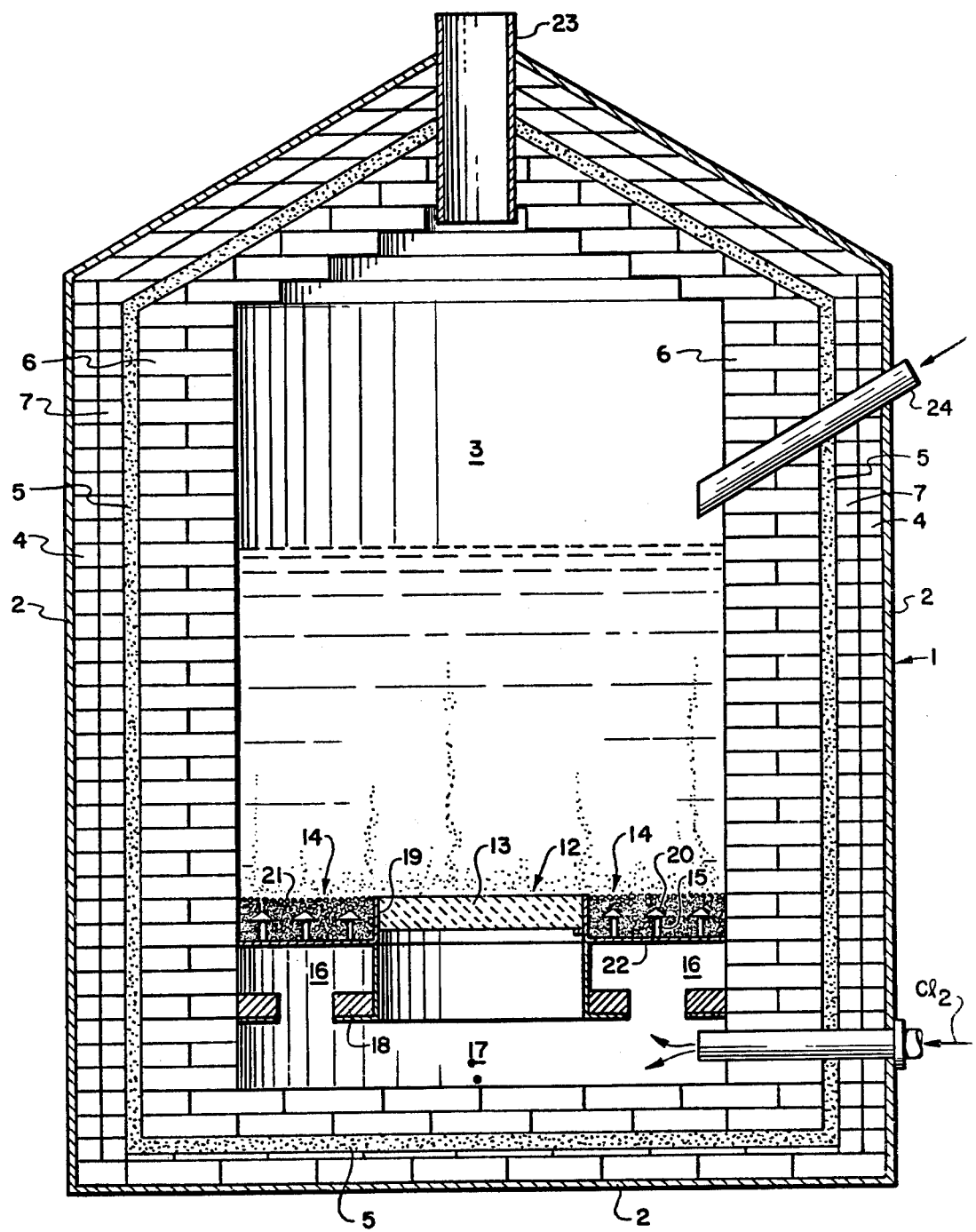

ALUMINUM CHLORIDE PRODUCTION PROCESS

This application is a continuation of application Ser. No. 423,808 filed Dec. 11, 1973, now U.S. Pat. No. 3,959,439 issued May 25, 1976, which application was a continuation-in-part of our earlier application Ser. No. 180,373 filed Sept. 14, 1971, now U.S. Pat. No. 3,796,551 issued March 12, 1974.

The present invention relates to an improved construction for a fluidized bed reaction chamber for the large scale economic production of aluminum chloride by the chlorination of aluminous material.

Although the potential advantages of utilizing aluminum chloride as a source material in the electrolytic production of aluminum have long been recognized, commercial realization thereof has been precluded by the inability of the art both to provide aluminum chloride of sufficiently high purity as to be utilizable therein and to provide aluminum chloride in any significant required quantity therefor in an economically acceptable manner. The long standing incentive and need for economically producible high purity aluminum chloride has resulted in extensive experimental exploration and evaluation of numerous suggested expedients for obtaining such long desired result. However, to date none of these suggested expedients has succeeded in satisfying the desired objective of commercial quantity production of economically producible high purity aluminum chloride.

Among the many problems attendant the economic, large quantity production of high purity aluminum chloride is the provision of a long-lived fluidized bed reaction chamber for the chlorination reaction that can both minimize the passage of unreacted chlorine values therethrough and can effectively withstand the highly penetrant action of corrosive chlorine at elevated temperatures for extended periods of time without utilization of materials that will deleteriously effect the basic reaction or undesirably contaminate the resultant product.

This invention may be briefly described as an improved construction for a long-lived fluidized bed reaction chamber for the continuous production of aluminum chloride by the conversion of aluminous materials in the presence of both chlorine and carbon values that minimizes if not effectively avoids, exposure of the bed contents to deleterious contaminants and the passage of unreacted chlorine values therethrough and which also effectively precludes deleterious seepage of the highly penetrant, high temperature chlorine values through the chamber lining to extend the operable life thereof. In its broader aspects the subject invention includes the provision of a composite multicourse, multifunctional lining for a fluidized bed reaction chamber for the continuous production of aluminum chloride for extended periods of time by the chlorination of alumina-bearing material in the presence of reductant carbon values.

Among the advantages of the subject invention is the provision of a reaction chamber of extended operating life for the continuous economic formation of aluminum chloride by the chlorination of aluminous material in the presence of reductant carbon values.

Still other advantages include the provision of a reaction chamber lining construction for production of aluminum chloride that minimizes exposure of the reaction constituents to deleterious contaminants, and effectively precludes penetration of the lining by the highly corrosive and highly penetrant chlorine values in the reaction mixture.

The object of this invention is the provision of an improved construction for a fluidized bed reaction chamber for the chlorination of aluminous material in the presence of reductant carbon values.

Other and further objects of the invention will become apparent from the following portions of this specification and from the accompanying drawing which, in accord with the mandate of the statute, illustrates the principles of the invention as embodied in a presently preferred embodiment thereof.

Referring to the drawing:

The sole FIGURE is a schematic vertical sectional view of a fluidized bed reaction chamber constructed in accord with the principles of this invention.

The production of aluminum chloride by the chemical interaction of aluminous materials with chlorine and carbon values has been long known to the art. Among the many expedients explored by the art in attempting to attain the long sought objective of high quantity, economic production of high purity aluminum chloride are the use of diverse aluminous or alumina bearing materials such as various clays, bauxite and different types of alumina and the use of diverse forms of carbon and chlorine, include composite forms thereof, such as phosgene. Recent developments have indicated however that a preferred reaction for the economic, high quantity production of aluminum chloride comprises the chlorination of carbon impregnated alumina of selective character. Operations associated therewith have also indicated the necessity of preventing the introduction of contaminants into the reaction mixture while maintaining the reaction continuity for extended periods of time in the presence of highly corrosive and highly penetrating high temperature chlorine as significant parameters in the attaining of the long sought objective of high quantity production of high purity aluminum chloride. To the above ends, the subject invention is particularly directed to an improved construction for a fluidized bed reaction chamber for the extended and continuous chlorination of alumina for the production of high purity aluminum chloride.

Referring to the drawing, there is illustrated a fluidized bed reaction chamber 1 for the production of aluminum chloride constructed in accord with the principles of this invention and broadly constituted of an external metal shell 2 and a selectively constituted multicourse lining defining a generally cylindrically shaped reaction zone 3 therewithin.

The multicourse lining comprises an outer course 4 disposed adjacent to the metal shell 2, a multilayered inner course 6 disposed in spaced relation with said outer course 4 and peripherally confining the reaction zone and an intermediate course 5 of compacted selectively constituted particulate material.

The inner course 6 is formed of a plurality of layers of stacked blocks of essentially reaction inert and non-contaminating material, preferably baked carbon of a character like that employed as anode material in aluminum electrolytic reduction cells using "prebaked" anodes (as contrasted with Soderberg anodes). Appropriate techniques for producing baked anode blocks are set forth in U.S. Pat. No. 3,009,863 for "Methods for Thermally Processing Carbon Articles" and on pages 38 to 40 of "The Chemical Background of the Aluminum Industry" by T. G. Pearson, Lectures, Monographs and Reports, 1955, No. 3, The Royal Institute of Chemistry, London, England. By "reaction inert", I intend to encompass lining materials that are essentially free of any tendency to react with the reagents and the reaction products present in the reaction chamber or to deteriorate under the conditions of the reaction. Such baked carbon material is also basically of the same chemical element, i.e. carbon, as at least one of the reaction components and hence, even if it deteriorates slightly under the reaction conditions, it will not be contaminating. The described usage of stacked blocks inherently provides interstices at the interfaces therebetween, and the inherent presence and accommodation thereof according to the present invention avoids the deteriorative effects that normally result from the presence of induced cracks in monolithic lining structures.

The outer course 4 disposed adjacent to the metal shell 2 is made up of one or more layers of heat insulating material, suitably conventional silica, alumina, or aluminasilica refractory brick low in titanium and iron, such as "Vegalite" of Harbison-Walker Refractories Co., Pittsburgh, "Alfrax" of the Carborundum Co., Niagara Falls, and "Sil-O-Cel Super" of Johns-Manville, New York.

The intermediate course 5 is formed of reaction inert and desirably non-contaminating particulate material that is disposed in such compacted condition as to provide a predetermined degree of resistance to the passage of penetrant gaseous material therethrough. Such intermediate course 5 is preferably formed of particles of alumina that have been heated sufficiently, preferably to alpha alumina, to reduce their possible reactivity with gases extant within or emanating from the reaction chamber and to concomitantly maximize the density thereof. Such high density particles, preferably of a particle size range characterized in that all of the particles are below 325 mesh (U.S. Sieve Series), are disposed intermediate the inner and outer courses in compacted condition such as to provide a bulk density of at least about 120 pounds per cubic foot and, preferably, 140 pounds per cubic foot. Such compacted alpha alumina, although of such markedly limited reactivity as to be practically reaction-inert as compared to the reaction alumina employable in the reaction chamber, is nevertheless also of essentially the same chemical composition as the reaction alumina and hence is also inherently non-contaminating in character. The inherent high density of the particles and the high bulk density of the course 5 operates to effectively seal the interface at the inner face of the stacked blocks of the inner course 6 and to pack the interstices extant thereat and to constitute a barrier layer that provides a resistance to gas flow therethrough, both transversely and longitudinally across each vertical tier of blocks, that is appreciably greater in magnitude than that extant in the zone 3 intermediate the inlet and outlet of the reaction chamber. The maintenance of such comparatively high resistance to flow of highly penetrant and highly corrosive gases extant within the reaction chamber, usually chlorine gas or gas containing chlorine values, both transversely through the intermediate course 5 toward the metal shell 2 and longitudinally thereof across each vertical tier of blocks of the inner course 5 means that the chlorine cannot bypass the chlorination reaction zone and results not only in high efficiency utilization of chlorine but also markedly extends the operating life of the chamber.

According to the preferred embodiment, there is interposed between the intermediate course 5 and the outer course 4 a lining course 7 constructed likewise of baked carbon anode block. Its purpose is to protect the refractory brick of outer course 4 from any chlorine or phosgene which might leak through intermediate layer 5. Likewise, since most of the chlorine values have reacted to form aluminum chloride by the time the fluidizing gases leave the top of the fluidized bed, it is possible to have the intermediate course 5 only extend at least to the level of the top of the fluidized bed. It is, for example, possible in an alternative embodiment to extend inner course 6 and intermediate course 5 only as high as the level of the top of the fluidized bed and then provide lining course 7 in the form of more massive anode blocks, this course 7 extending upwards to support the dome of the chamber.

The bottom of the fluidized bed chamber comprises a gas distribution inlet assembly, generally designated 12, for effecting the controlled introduction of reactant gas containing chlorine or chlorine values thereinto.

Such gas distribution assembly 12 desirably comprises a central, randomly permeable porous gas distribution plate or member 13 for effecting the introduction of a central gas stream of selective diffuse character and crosssection to fluidize a particulate bed of aluminous or aluminabearing material to be maintained in zone 3 and to react therewith. Such distribution member 13 is preferably mounted in a supporting ring 19 and additionally serves as a removable manhole cover for access to the interior of the vessel. The main gas distribution body 13 is preferably in the form of a block or plate of porous silica having an appreciable thickness or depth relative to its crosssection dimension and is centrally disposed in the chamber. The described randomly porous gas distribution plate operatively functions to provide a myriad of individual tortuous gas passages therethrough and effects the subdivision of the main gas stream into a multiplicity of individual discrete streams of diminutive cross-section that compositely constitute the core stream. Perimetrically disposed about the main gas distribution plate 13 is an annular secondary gas distribution assembly, generally designated 14. Such secondary distribution assembly 14 laterally confines the main gas flow distribution block 13 and effects issuance of a perimetric stream of reactant gas in the form of a boundary stream around the central gas stream and in concurrent direction therewith to additionally sweep the surface of the inner course of lining 6.

The perimetrically disposed secondary distribution assembly 14 is arranged to provide a composite flow of substantially uniform radial dimension and, for the described circular main distribution block 13, will be generally in the form of a perimetric annulus disposed thereabout. Such assembly 14 may, as shown in the drawing, be constituted by a plurality of arcuate slots or by a plurality of individual nozzles 15 fed through the annulur distributor chamber 16, connected to the main fluidizing reactant gas supply chamber 17 through a plurality of channels 18. In particular, the nozzles 15 are operatively distributed throughout the crosssectional area of the space between the inner lining course 6 and the periphery of the distribution block 13, and are preferably surmounted by bubble caps 20 and other diffusing means 21 to effect a radial diffusion of the emitted gas and convert the separately issued streams into a stream of upwardly moving gas. The bubble cap-surmounted nozzles can be composed substantially of quartz, graphite, alumina, silicon oxynitride, nickel alloys, or the like, for example, to withstand the vigorous reaction conditions, and especially the high temperatures which may be generated during the exothermic chlorination reaction to be carried out in the chamber.

In accordance with a preferred feature of the invention, the diffusing means 21 comprises a bed of loosely packed porous refractory spheres, as for example composed substantially of calcined alumina, supported by the plate 22 and loosely packed about the nozzles 15, to insulate the nozzles from the heat generated by the reaction, e.g. the exothermic chlorination of alumina bearing material, and to more uniformly distribute the emitted gas throughout the operative flow cross-sectional area of such nozzle means.

The reactor chamber 1 also includes a gaseous effluent outlet 23 remote from the gas distribution inlet for removal of the effluent gases from the system, and can have material inlet means schematically shown at 24, of conventional character to permit introduction of other reactants and the fluidized bed particles.

Although the majority of the length of zone 3 is shown as having a cylindrical configuration, it is advantageous that the course 6 taper inwardly upward from the distribution assembly 14 for at least the depth of the fluidized bed, as described in U.S. patent application Ser. No. 180,419 of Cook et al., for the purpose of selectively disturbing and disrupting the upward flow of gas in the vicinity of the side walls to provide improved gas turbulence and fluidization at the side walls.

In the operation of the described unit, a central stream of chlorine gas made up of a multiplicity of uniformly distributed individually constituted diffuse gas streams of small cross-sectional extent will be introduced into the fluidized bed reaction zone 3 through the main gas distribution plate 13. This central stream will be perimetrically bounded by a concurrent secondary stream of reactant gas serving as a boundary curtain to sweep the face of the inner lining course 6 in the reaction zone.

As will now be apparent to those skilled in this art, the interrelated physical and chemical properties of the individual courses making up the described multicourse lining cooperatively function to preclude passage of highly penetrant and corrosive chlorine externally of the reaction chamber through interposition of a selectively constituted barrier of essentially reaction inert and non-contaminating materials to provide a reaction chamber of markedly extended operating life for the production of high purity aluminum chloride by the chlorination of aluminous material in the presence of reductant carbon therein.

It will be appreciated that the instant specification and drawing are set forth by way of illustration and not limitation, and that various modifications and changes may be made without departing from the spirit and scope of the present invention which is to be limited only by the scope of the appended claims.

Having thus described my invention, I claim:

1. In the production of aluminum chloride by the chemical interaction of carbon and chlorine values with aluminous material
  the improvement comprising
  introducting said chlorine values through a regent inlet to contact said aluminous material within a reaction zone of a reaction chamber having an outlet and including
  (1) a multilayer lining that comprises an inner and gas permeable lining wall of reaction-inert material, and an intermediate layer of reaction-inert particulate material disposed outwardly of said inner layer and providing a resistance to gas flow that is greater than the resistance to gas flow extant in the reaction zone between the inlet and outlet of said reaction chamber to preclude displacement of said chlorine values through said intermediate layer,
  and (2) wall means disposed outwardly of said intermediate layer and functioning to support the outer side of the intermediate layer.

* * * * *

UNITED STATES PATENT OFFICE
CERTIFICATE OF CORRECTION

Patent No. 4,080,435      Dated March 21, 1978

Inventor(s) Roy M. Pope

It is certified that error appears in the above-identified patent and that said Letters Patent are hereby corrected as shown below:

Col. 4, line 26 change "crosssection" to -- cross-section --;

line 27 change "aluminabearing" to -- alumina-bearing -- line 34 change "crosssectional" to --cross-sectional--;

line 58 change "annulur to -- annular --;

line 61 change "crosssectional" to --cross-sectional--;

Col. 6, line 24 change "introducting" to -- introducing --;

Signed and Sealed this

Twenty-first Day of November 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,080,435            Dated March 21, 1978

Inventor(s) Roy M. Pope

It is certified that error appears in the above-identified patent and that said Letters Patent are hereby corrected as shown below:

Col. 6, line 24 change "regent" to --reagent--;

Signed and Sealed this

Twentieth Day of March 1979

[SEAL]

Attest:

RUTH C. MASON
*Attesting Officer*

DONALD W. BANNER
*Commissioner of Patents and Trademarks*